United States Patent [19]

Yamamichi et al.

[11] 4,129,877
[45] Dec. 12, 1978

[54] PHOTOGRAPHIC CAMERA HAVING ELECTROMAGNETIC OPERATION CONTROL

[75] Inventors: Masayoshi Yamamichi, Kawasaki; Yukio Iura, Yokosuka; Nobuo Tezuka, Tokyo; Satoshi Watanabe, Inagi; Masanori Uchidoi, Kawasaki; Hiroshi Aizawa, Machida, all of Japan

[73] Assignee: Canon Kabushiki Kaisha, Tokyo, Japan

[21] Appl. No.: 710,889

[22] Filed: Aug. 2, 1976

[30] Foreign Application Priority Data

Aug. 5, 1975 [JP] Japan .................................. 50-95120

[51] Int. Cl.² .............................................. G03B 9/06
[52] U.S. Cl. .................................................... 354/271
[58] Field of Search ...................... 354/40, 41, 42, 43, 354/271, 234, 235

[56] References Cited

U.S. PATENT DOCUMENTS

| 3,950,770 | 4/1976 | Imura ................................. 354/234 X |
| 3,972,055 | 7/1976 | Matsuda et al. ................... 354/40 X |
| 3,988,748 | 10/1976 | Iura ..................................... 354/43 X |

*Primary Examiner*—Michael L. Gellner
*Attorney, Agent, or Firm*—Toren, McGeady and Stanger

[57] ABSTRACT

A camera having an automatic diaphragm control range where the exposure value derived from an exposure control circuit is introduced to a diaphragm mechanism through a scanning mechanism. The termination of scanning operation is electromagnetically effected by an arresting device comprising an electromagnet, an arresting lever carrying an armature, a first spring connected to the arresting lever to urge the armature for movement toward the electromagnet, a driving lever pivotal about a common shaft of the arresting lever and arranged to cooperate with a cocking and release member, a second spring connected to the driving lever and having a stronger force than the first spring by a magnitude necessary to permit the arresting operation of the arresting lever against the first spring, and a transmitting pin mounted on the arresting lever and extending into the range of movement of the driving lever at a point where the driving lever in the cocked position is spaced apart from the pin by a distance large enough to insure that the armature is brought into intimate contact with the electromagnet yoke under the same conditions each time the scanning mechanism is reset as the camera is cocked. The transmitting pin also serves as a position-adjusting means in order to insure that the time interval between the deenergization of the electromagnet and the initiation of arresting operation of the arresting lever by the driving lever is minimized and made uniform from camera to camera to improve the accuracy of diaphragm control.

6 Claims, 4 Drawing Figures

F I G. 2
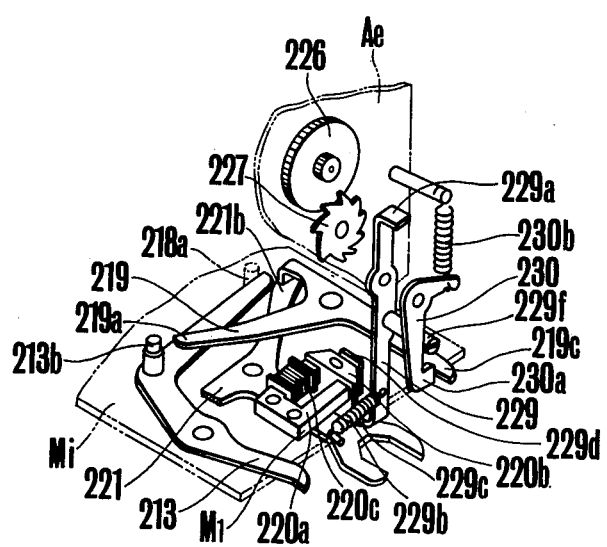

PHOTOGRAPHIC CAMERA HAVING ELECTROMAGNETIC OPERATION CONTROL

BACKGROUND OF THE INVENTION

1. Field of the Invention

This invention relates to photographic cameras having electromagnetic operation control and, more particularly, to an improvement in the exposure control accuracy of the electromagnetic control device by making uniform the time interval during which the actuating process is performed.

2. Description of the Prior Art

Conventional photographic cameras are generally equipped with diaphragm mechanisms either of the type where the task of introducing a proper diaphragm aperture value for the photographing lens is completed by manual setting of the diaphragm control ring provided in the lens mount barrel, or of the type where the position of the deflected pointer of the measuring instrument of the exposure meter system is scanned and the scanning result is introduced into the diaphragm mechanism through a mechanical control device. Recently, however, a new type of camera has been proposed in which the exposure value derived from an exposure control circuit is introduced into the diaphragm mechanism through a canning mechanism of which the operation is electromagnetically terminated by an arresting device as the diaphragm mechanism is automatically adjusted in position from the fully open aperture to a proper aperture value dependent upon the computed exposure value. With such an electromagnetically operated diaphragm control mechanism, it is required that when the solenoid of the electromagnet is energized, the armature must be retained by the yoke at an accurately controlled location, or otherwise the arrested position of the scanning mechanism would be varied with variation of the resultant diaphragm aperture value despite the fact that the exposure value is maintained equivalent, whereby the accuracy of exposure control is impaired. This requirement, however, can not be fulfilled in a prior art electromagnetically operated arresting device shown in FIG. 1, mainly because the arresting lever 2 is directly biased by a strong driving spring 2a to urge the armature 1b for movement away from the yoke 1a of the electromagnet 1. The arresting lever 2 has a rectangularly bent portion at the opposite end thereof to that carrying the armature 1b and is arranged to arrest at the bent portion an ever-rotating stop wheel 3 constituting part of the scanning mechanism when the solenoid 1c is deenergized after a cocking and release member 4 is released from the cocked, or latched position to turn counter-clockwise. The scanning result is introduced to the lens aperture mechanism shown in FIG. 3 through a control lever 231-and-diaphragm presetting ring 202 connection. The arrested position of the scanning mechanism is dependent upon the exposure value derived from an exposure control circuit of FIG. 4. After an exposure with the thus-adjusted diaphragm mechanism has been completed, a film winding lever may be cocked to turn a lever 5 of FIG. 1. Such movement of lever 5 causes clockwise movement of the lever 4 which in turn causes clockwise movement of the arresting lever 2. When the lever 4 is latched by a hook-shaped end 6a of a lever 6, the armature 1b is positioned closest to the yoke 1a but not in intimate contact with the yoke 1a. This gap constitutes a source for reducing the accuracy of automatic diaphragm control because of the following reasons. When the camera is released, the solenoid 1c is energized to attract the armature 1b and at the same time the scanning mechanism is actuated to initiate rotation of the stop wheel 3. At the termination of duration of a time interval dependent upon the exposure value derived from the exposure control circuit, the solenoid 1c is deenergized causing the arresting lever 2 to be turned counter-clockwise under the driving effect of the spring 2a until the bent portion of lever 2 engages one tooth of the stop wheel 3, whereby the automatic formation of the proper diaphragm aperture is effected. The duration of the actuating or a scanning time period is, therefore, largely affected by the gap between the armature and the yoke in the cocked position. This gap varies in magnitude from camera to camera depending upon the degree of accidental errors from the tolerance limits within which the various moving parts of the arresting device are to be manufactured and assembled, as the arresting lever 2 is biased by the driving spring 2a in the opposite direction to that in which the armature 1b can be brought into intimate contact with the yoke 1a. Another source for assisting in the gap variation is the different magnitude of force under which the film winding or cocking lever is operated to reset the arresting device.

Such prior art arresting device has another drawback that, as the driving spring of strong force is directly connected to the arresting lever, it is required for the electromagnet to provide a correspondingly strong force of attraction for the armature, or otherwise a mechanical shock which occurs when the camera is released would cause movement of the armature away from the yoke despite the energization of the solenoid, resulting in the overexposure of the photographic film. As the attracting force increases, the actuating or scanning time period is unavoidably increased with increase in the probability of letting a good shutter opportunity slip.

SUMMARY OF THE INVENTION

An object of the present invention is to provide a camera of the type described which has overcome the above-mentioned conventional drawbacks.

Another object is to provide a diaphragm control mechanism having an electromagnetically timed scanning arrangement in which the armature is retained at an accurately controlled location relative to the yoke each time the diaphragm mechanism is reset, whereby the accuracy of automatic diaphragm control is improved.

Still another object is to decrease the actuating time interval period, namely, the time interval between the energization of the electromagnet solenoid and the arrestment of the scanning mechanism and consequently to decrease the time interval between the camera release, or the depression on the shutter button and the initiation of opening operation of the shutter mechanism, whereby the photographer may seize upon a good shutter opportunity, and further an accurate exposure is resulted.

Other objects, features and advantages will become apparant from the following detailed description taken in conjunction with the accompanying drawings in which:

BRIEF DESCRIPTION OF THE DRAWINGS

FIG. 2 is a perspective view of one embodiment of the arresting device according to the invention.

DESCRIPTION OF THE PREFERRED EMBODIMENT

Figure 1:
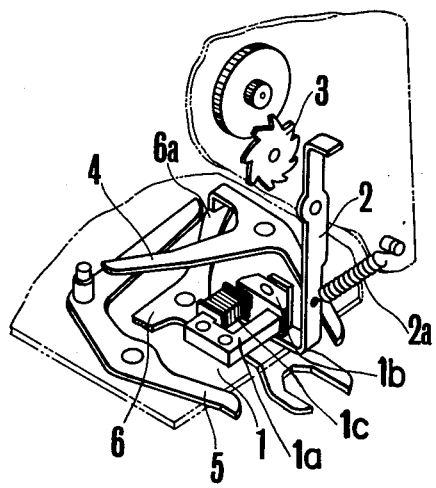
FIG. 1 is a perspective view of the various parts of an arresting device incorporated in a diaphragm control mechanism according to the prior art.

Referring now to FIG. 2, there is shown one embodiment of an electromagnetically operated arresting device for a scanning mechanism which will be described later in connection with FIG. 3. The arresting device comprises an electromagnet $M_1$ constructed from a U-shape core or yoke 220a with a solenoid 220c, an arresting lever 229 having a rectangularly bent portion at one end 229a thereof, the opposite end of which is also rectangularly bent at 229c to provide a support for an armature 220b pivotal about a shaft 229e, the range of pivotal movement of the armature 220b being limited by a plate 229d extending upwardly from the bent portion 229c, a first spring 229b connected to the arresting lever 229 to urge the armature 220b for movement toward the yoke as the arresting lever 229 is turned clockwise as viewed in FIG. 2, a driving lever 230 pivotal about a common shaft of the arresting lever 229 and arranged to cooperate with a cocking and release member 219 through a lever end 230a-against-lever end 219c abutment during the cocking process, and to cooperate with an eccentric pin 229f during the arresting process, the eccentric pin 229f extending from the arresting lever 229 into the range of movement of the driving lever 230 at a point where the driving lever 230 in the cocked position is spaced apart from the pin 229f by a distance large enough to insure that the armature 220b is brought into intimate contact with the yoke 220a under the action of the first spring 229b each time the arresting device is reset to the cocked position, and a second spring 230b connected to the driving lever 230 and having a stronger springing force than the first spring 229b by a magnitude necessary to permit the arresting operation of the arresting lever 229 against the force of the first spring 229b as the driving motion of lever 230 is transmitted through the eccentric pin 229f to the arresting lever 229.

Figure 3:
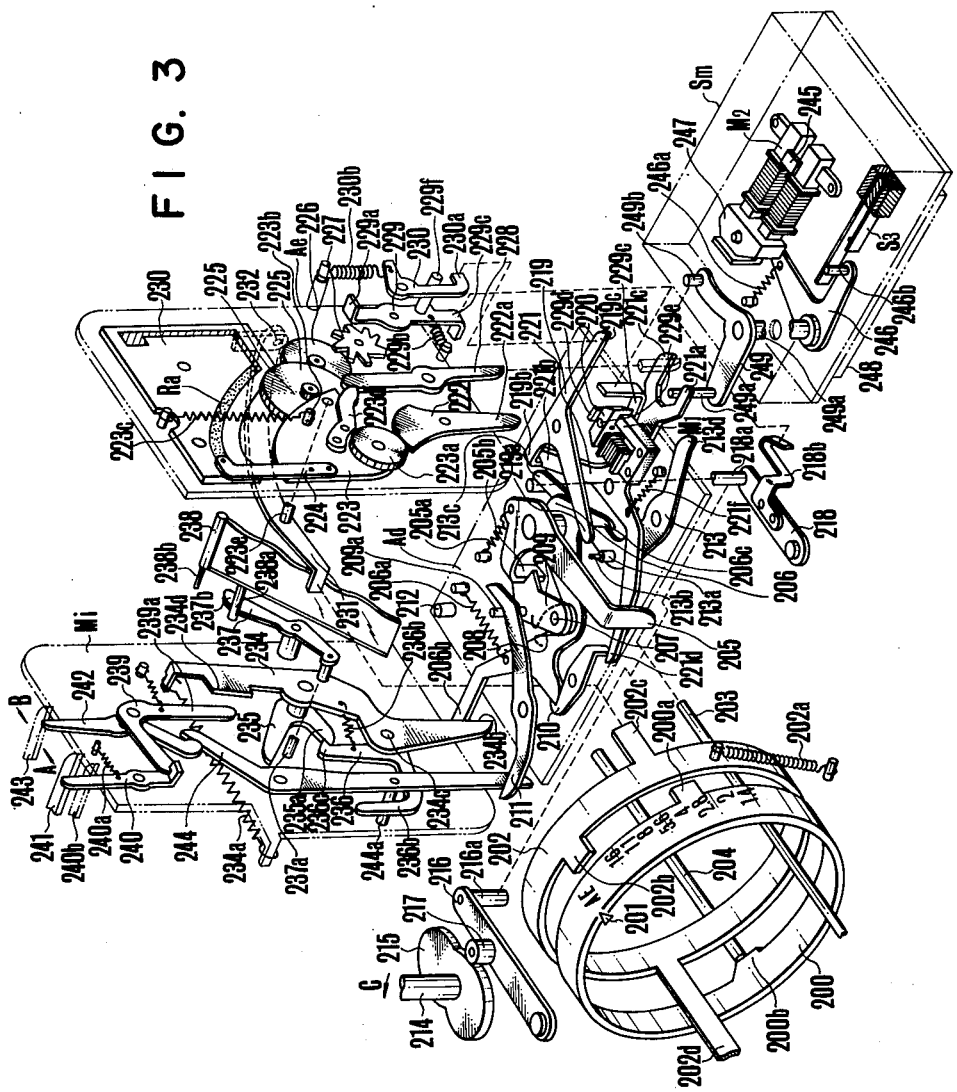
FIG. 3 is an exploded perspective view of the various mechanisms of a single lens reflex camera employing the arresting device of FIG. 2.

FIG. 3 shows the essential parts of a single lens reflex camera employing the arresting device of FIG. 2 and including a lens aperture mechanism, a scanning mechanism, a diaphragm drive and reset mechanism, a mirror mechanism and a release mechanism, each of which will now be described.

The lens aperture mechanism mounted in an individual interchangeable objective lens barrel not shown comprises a manually operable diaphragm preselecting ring 200 having cut thereon a symbol AE indicative of the shutter preselection automatic daylight exposure control mode and a diaphragm scale with graduations, namely, 16, 11, . . . , 1.4, each of which can be brought into registry with a stationary index 201 provided on the barrel and having a stop lug 200a and a cam lobe 200b, and an automatically operable diaphragm presetting ring 202 which is biased by a spring 202a in a clockwise direction as viewed in the figure and which has a lug 202b arranged to be engageable with the stop lug 200a. The diaphragm presetting ring 202 is provided with first and second arms 202c and 202d which extend parallel to the optical axis of the lens rearwardly and forwardly respectively. The position of the second arm 202c determines the position of a not shown bell crank member through a not shown cam ring, which in turn determines the amount of movement of a not shown drive ring member for the diaphragm blade assembly, thereby the scanning result which will be described later is translated into the proper diaphragm aperture value when the camera is set in the shutter preselection automatic exposure control range. In order to switch the camera from the automatic diaphragm control mode to the manual diaphragm control mode, or vice versa in response to the setting of the diaphragm preselecting ring 200 at symbol AE into or out of registry with the index 201, there is provided a pin 204 arranged to be brought into riding-on engagement with the cam lobe 200b when the ring 200 is turned to place symbol AE in registry with index 201.

The diaphragm drive and reset mechanism comprises the drive control lever 205 pivoted at a shaft and biased by a spring 205a in a counter-clockwise direction, a spring-powered drive lever 206 pivoted at the common shaft of the lever 205 and having a transmission lever 209 pivoted at a pin 207 upwardly extending from lever 206 at a location near the center thereof, the lever 209 having a pawl arranged to be engageable with and disengageable from a perpendicularly downwardly extending projection 205b of drive control lever 205 and having an upwardly extending pin 209a and being biased by a spring 208 to urge the pawl of lever 209 for driving engagement with the projection 205b and a pawl lever 210 for latching the drive lever 206 in the cocked position against the force of spring 206a. In order to disengage the transmission lever 209 from control lever 205 as soon as the rear shutter curtain has run down, there is provided a lever 211 engaging at one end thereof with the pin 209a, the opposite end of which is operatively connected to a rear curtain drive gear not shown through a lever arrangement including levers 242, 243 and 244. In order to limit the clockwise movement of drive lever 206, there is provided a stopper pin 212 positioned in one corner of plate Ad.

The unit plate Ad further carries a cocking and release mechanism which comprises a three-armed lever 221 engaging at one arm end 221d with the latching lever 210, engaging at a hook-shaped end of another arm 221b with a rectangularly downwardly bent portion 219b of another three-armed lever 219 constituting part of the arresting device of the invention, and engaging at one projection 221c of the forked portion of the other arm with a latching lever 228 of the scanning mechanism, and a cocking or resetting lever 213 having coaxial projection pins 213a and 213b mounted at a location near the center thereof for engagement with lever arms 206a and 219a respectively and having one arm 231d engaging with a pin 218a mounted on a lever 218 constituting part of the cocking mechanism. The cocking mechanism further includes a lever 216 having a cam follower roller 217 arranged for engagement with a camming surface of a cam disk 215 mounted on one end of a film winding shaft 214, the opposite end of which has a film winding lever not shown.

The mirror mechanism includes a mirror 238 pivotally mounted on a pair of stub shafts 238b and positioned between the objective lens and the focal plane shutter not shown. The mirror 238 is movable between its viewing and non-viewing positions by a control lever 237 in engagement at one end portion 237b with a stud 238a extending from the side of the support member of mirror 238, the opposite end portion of lever 237 having an elongated pin 237a extending into a space of an angular lever 235 rotatably mounted on a common pivot shaft of drive lever 234. One arm 235a of angular lever 235 is latched by a pawl 236a of mirror return control lever 236 which is pivotally mounted on drive lever 234 at a pin 234c, which is biased by a spring 236b to urge the pawl 236a for latching engagement with the angular lever end 235a, and which has a tail 236c arranged to cooperate with a pin 244a mounted on the lever 244 of which the downwardly extending arm end engages with the lever 211 of the diaphragm drive mechanism. The mirror drive control lever 234d is further provided with a projection 234d cooperative with one arm 239a of a lever 239 constituting a front curtain actuating lever arrangement including a lever 240 biased by a spring 240a and engaging at one end with one arm of lever 239, and at the opposite end with a front curtain latching lever 241, and a resetting lever 240b for the lever 240. The levers 239 and 242 are mounted on a common shaft in rotatable relation independently of each other. The scanning mechanism mounted on a plate Ae includes a sector gear 223 having a gear 223a fixedly coaxially mounted thereon, the gear 223a engaging with a toothed segment of a resetting lever 222 of which a projection 222a engages with the lever end 213d, and having an arm 223d fixedly mounted thereon for engagement with the pawl of a latching lever 228 of which the tail engages with the forked portion 221c, of the release lever 221, and having a slider 224 of a variable resistor Ra and a gear train or speed increase governor including gears 225 and 226, and a stop wheel 227. On the opposite side of plate Ae is mounted a pivotal arm 232 having a free end on which a diaphragm presetting ring control lever 231 is pivotally mounted at one end, the opposite end of which carries the end porition of the arm projection 202c. The lever 231 is connected to the sector gear 223 through a pin 223e arranged in eccentrically parallel relation to the shaft of sector gear 223. The sector gear 223 is biased in a counter-clockwise direction by a spring 223c which is weaker than spring 202a.

The camera release mechanism with a casing made of a nonmagnetic material indicated by dot-and-dash lines Sm comprises an electromagnet $M_2$ associated with a permanent magnet 245, an armature 247 cooperative with the magnets $M_2$ and 245 and movably mounted on one arm of a crank lever 246 which is biased in a counter-clockwise direction by a spring 246a having a weaker springing force than the attracting force of the permanent magnet 245 but having a stronger springing force than the spring 221f of the release lever 221, and which has an upwardly extending pin 246b mounted on the other arm of lever 246 and arranged to operate the memory switch S3 in such manner that when the solenoid of electromagnet $M_2$ is energized to cancel the magnetic force of permanent magnet 245, the lever 246 is turned about a crank shaft 249a in the counter-clockwise direction to open switch S3. The counter-clockwise movement of lever 246 is transmitted through the crank shaft 249a extending through a hole provided in the upper panel of the casing Sm to a bellcrank 249 mounted on the opposite shaft end of crank shaft 249a to that connected to the lever 246. The bellcrank 249 has two pins 249a and 249b mounted on the respective arms and engaging with one projection 221a of the forked portion of the release lever 221 and a resilient member 218 of the cocking lever 218 respectively. The casing Sm is provided with a shield member 248 for shielding the magnetic flux due to the permanent magnet 245.

Figure 4:
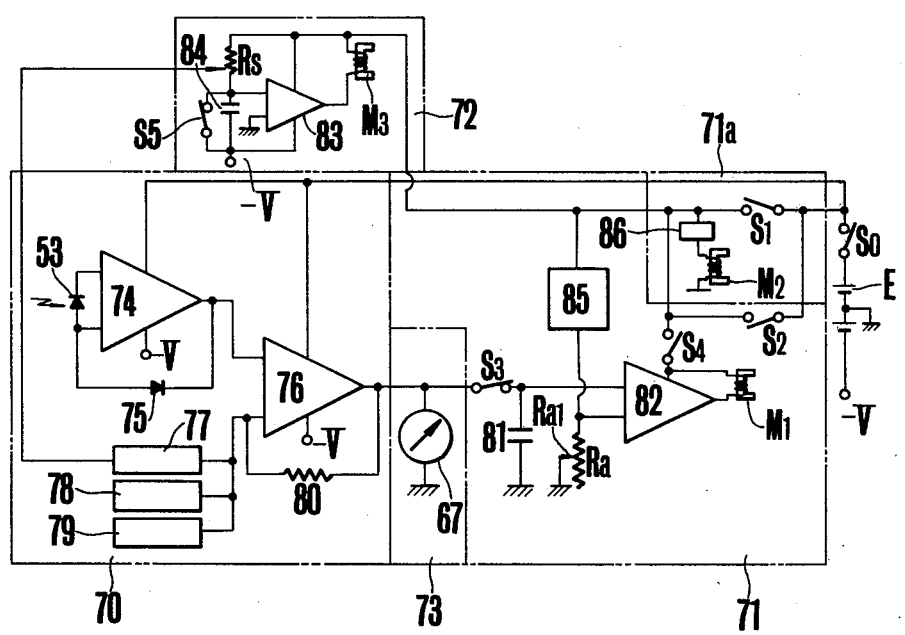
FIG. 4 is a schematic view, partly in block form, of an automatic exposure control circuit usable with the electromagnetically operated diaphragm control mechanism of FIGS. 2 and 3.

FIG. 4 shows an automatic exposure control system adapted for use in the camera of FIG. 3. The system comprises an exposure value computing circuit 70, a diaphragm control circuit 71, an electronic shutter circuit 72 and an exposure value indicator 73, the diaphragm control circuit 71 and the shutter circuit 72 being connected through a common release circuit 71a to an electrical energy supply source or battery E.

The exposure value computing circuit 70 includes a photosensitive element 53, an operational amplifier 74 having first and second input terminals between which the photo-sensitive element 53 is connected, a feedback diode 75 connected between the input and the output of the operational amplifier 74, an Apex type computer 76 having a first input terminal connected to the output terminal of the amplifier 74 and having a second input terminal connected to the common output lead of various exposure control parameter setting circuit means, namely, shutter speed setting circuit 77, film speed setting circuit 78 and exposure correction factor setting circuit 79, and a fixed resistor 80 connected between the second input and output of computer 76.

The diaphragm control circuit 71 includes a condenser 81 grounded at one pole and connected at the other pole through a switch S3 to the output terminal of the exposure value computing circuit 70, a comparator 82 having a first input terminal connected to the non-grounded pole of condensor 81 and having a second input terminal connected to a point on the connection between a constant current circuit 85 and the variable resistor of FIG. 3, and an electromagnet $M_1$ with a solenoid connected to the output of the comparator 82. The electrical energy supply for the electromagnet $M_1$ is effected through a manually closed switch $S_4$, and either of switches $S_1$ and $S_2$ parallel-connected to each other but series-connected to the switch $S_4$ and also to the power switch $S_0$. The switch $S_1$ constitutes the release circuit 71a together with a delay circuit 86 and the electromagnet $M_2$ of FIG. 3, these parts 86 and $M_2$ being connected in series to each other and to switch $S_1$. The delay circuit 86 functions to insure that the solenoid $M_2$ is energized only after the shutter release has been made. If the apparatus of FIG. 3 is provided with mechanical delay means of the same function as above, there is no need to employ such delay circuit.

The shutter control circuit 72 comprises a Schmitt type trigger circuit 83 having a first input terminal connected to a point on the connection between a timing condenser 84 and a variable resistor Rs responsive to the setting of the shutter speed at circuit 77, and having a second input terminal which is grounded, a start switch $S_5$ connected across the timing condenser 84, and an electromagnet $M_3$ with a solenoid connected to the output terminal of the trigger circuit 83.

The operation:

To make an automatic exposure in the shutter preselection exposure range, the diaphragm preselecting ring is manually turned to place symbol "AE" into registry with the index 201 as shown in FIG. 3, causing the cam follower pin 204 to ride on the cam lobe 200b, thereby the switch $S_4$ of FIG. 4 is closed. Next the power switch $S_0$ is turned on to render operative the exposure value computing circuit 70, and then the camera is aligned with an object intended to be photographed, so that a portion of the light entering through the objective lens not shown is received by the photo-sensitive element 53. Responsive to the level of brightness of the object, the element 53 produces an output voltage which after has been compressed by the operational amplifier 74 with its feedback diode 75 is applied to the first input terminal of the Apex type computer 76. Also applied to the second input terminal of the computer 76 are signals from the shutter speed, film speed and exposure correction factor setting circuits 77, 78 and 79. Based on these exposure control parameter values, the computer 76 performs an Apex computation to derive an exposure value, in this instance, an effective diaphragm aperture value which is indicated by the meter 67 of FIG. 4. At the same time, the output voltage of the computer 76 is applied through the normally closed switch $S_3$ both to the timing condenser 81 and to the first input terminal of comparator 82.

When a shutter release button not shown is depressed to close the switch $S_1$, the comparator 82 is actuated to permit the energization of the solenoid of electromagnet $M_1$ of the arresting device for the scanning mechanism, and, at the same time, the Schmitt type trigger circuit 83 is actuated to permit the energization of the solenoid of electromagnet $M_3$ controlling the latching operation of the rear curtain control gear 43. After a short time period determined by the delay circuit 86 from the closure of switch $S_1$, the solenoid of electromagnet $M_2$ of the release mechanism in the casing Sm is energized to cancel the magnetic flux of permanent magnet 245, causing counter-clockwise movement of the armature-carrying lever 246 along with the bellcrank 249 under the action of spring 246a. At this time, the memory switch $S_3$ is opened. Such counter-clockwise movement of bellcrank 249 causes clockwise movement of the cocking and release lever 221 against the force of spring 221f through the pin 249a-and-projection 221a connection, thereby the three latching member i.e, lever 210 for the diaphragm drive mechanism, lever 228 for the scanning mechanism, and lever 219 for the arresting device are caused to move from their cocked positions.

The scanning operation of the slider 224 along an arcuate resistance track of the variable resistor Ra is initiated while the arresting lever 229 is retained in the cocked position by the previously energized electromagnet $M_1$ despite of the fact that the latching lever 219 has no action on the driving lever 230 at the end 230a to permit transmission of the driving force from the second spring 230b through the driving lever 230 and eccentric pin 229f to the arresting lever 229. As the sector 223 of the scanning mechanism is turned clockwise under the action of spring 202a which overcomes the force of spring 223c connected between the sector 223 and a pin mounted on the plate Ae, the variable resistor Ra provides ever-varying resistance values which are detected by the comparator 82. When the resistance value has reached a level dependent upon the exposure value stored on the memory condenser 81, the duration of energization of the electromagnet $M_1$ is terminated to release the arresting lever 229 from the cocked position, thereby the driving lever 230 drives the arresting lever 229 for counter-clockwise movement through the transmission pin 229f under the action of second spring 230b which overcomes the first spring 229b until the pawl 229a engages one tooth of the stop wheel 227 to arrest the scanning mechanism. The scanning result is introduced through the diaphragm presetting ring control lever 231 to the lens aperture mechanism where it is translated into the proper diaphragm aperture value. In other words, the value of the automatic diaphragm in the shutter preselection automatic exposure range is determined by the stopped position of the diaphragm presetting ring 202 in accordance with the light value sensed by the photosensitive element 53, the preselected shutter speed, the sensitivity of the used film and the adjusted exposure correction factor.

As the lever 210 is turned counter-clockwise, the springpowered diaphragm drive lever 206 is disengaged from the latching lever pawl 210, and then turned clockwise under the action of spring 206a, while turning the diaphragm control lever 205 in cooperation with the lever 209. At this time, the hold switch $S_2$ is closed, and the pin 203 is operated along with the diaphragm blade drive ring in the lens aperture mechanism to be moved in a clockwise direction about the optical axis of the lens while adjusting the size of the aperture opening from the maximum possible value to the final scanning result. In response to the clockwise movement of diaphragm drive lever 206, the mirror drive lever 234 is actuated for counter-clockwise movement under the force of spring 234a through the abutting engagement at the lever end 234b with the lever end 206b. Such movement of lever 234 is transmitted through levers 236 and 235 to the mirror control lever 237 causing the mirror 238 to move from the viewing position to the non-viewing position.

The shutter release lever arrangement 239, 240 and 241 is actuated when the projection 234d of the mirror drive lever 234 strikes the lever end 239a, and the lever 241 is caused to move in the direction indicated by arrow A under the action of spring 240a, thereby the front curtain is released from the cocked position to run down to the fully open position. At the termination of duration of the exposure time set in the circuit 77, the lever 243 is actuated to move in the direction indicated by arrow B causing counter-clockwise movement of lever 242, and then causing clockwise movement of lever 244 which in turn causes counter-clockwise movement of latching lever 236 against the force of spring 236b, thereby the mirror 238 is returned to the viewing position. In this time interval, the clockwise movement of lever 244 also causes disengagement of lever 207 from the diaphragm control lever 205 against the force of spring 208 through lever 211, so that the diaphragm blades are reset to the maximum open position as the lever 205 is turned counter-clockwise under the action of spring 205a.

After the exposure has been completed, the film winding lever not shown may be cocked to advance the film through the length of one frame and to reset the shutter mechanism to the cocked position by means including the lever 240b, thereby the shaft 214 with cam disk 215 is turned counter-clockwise as indicated by arrow C. The motion of cam disk 215 is transmitted through the camming engagement with the cam follower 217 on the transmitting lever 216 to the lever 218, causing clockwise movement of lever 213 through the pin 218a and also causing counter-clockwise movement of bellcrank 249 through the resilient member 218b-and-pin 249b connection. As the lever 213 is turned clockwise, the diaphragm drive lever 206 is turned counter-clockwise against the force of spring 206a through the end 206a-and-pin 213a connection to the latched position by lever 210, and the release lever 219 for the arresting device is turned counter-clockwise through the end 219a-and-pin 213b connection to the latched position.

During this resetting process of the arresting device of the invention, the driving lever 230 is turned clockwise against the second spring 230b by the release and resetting lever 219 through the end 230a-and-end 219c connection, while the arresting lever 229 is caused to follow the driving lever 230 through the transmitting eccentric pin 220f as the first spring 229b tends to turn the arresting lever 229 in the clockwise direction. When the film winding lever reaches the advanced most possible position, the downwardly bent portion 219b of the lever 219 is engaged with the hock-shaped portion 221b of the lever 221 while the driving lever 230 is positioned beyond the range of movement of the transmitting eccentric pin 229f to establish the intimate contact between the armature 220 and the yoke 220c under the action of the first spring 229b along. Next when the pressure of the finger of the operator's hand is removed from the film winding lever, the release lever 219 is acted on through the driving lever 230 by the second spring 230b which seeks to turn the release lever 219 together with the driving lever 230 both into the counter-clockwise directions. If there are some plays between levers 221 and 219 and between other related moving parts, the driving lever 230 is correspondingly returned back to decrease the distance between the driving lever 230 and the transmitting pin 229f. In order to avoid the development of shock which will occur when the driving lever 230 strikes the transmitting pin 229f during the arresting process, it is preferred to minimize, if possible, eliminate the gap between the driving lever 230 and the pin 229f under the condition that the release lever 219 for the arresting device is not overcooked. This can be achieved by adjusting the angular position of the eccentric pin 229f.

The clockwise movement of lever 213 further causes a clockwise movement of lever 222 through the end 222a-and-end 213d connection, while turning the diaphragm presetting ring 202 in the counter-clockwise direction to the start position shown in FIG. 3 against the force of spring 202a, thereby to sector arm 223d is brought into latching engagement with the latching lever 228. Thus, the resetting of the scanning mechanism is completed.

The movement of diaphragm drive lever 206 causes clockwise movement of mirror drive lever 234 against the force of spring 234a through the end 206b-and-end 234b connection, and is continued until the lever 206 is latched by lever 210. As the mirror drive lever 234 is turned, the mirror return control lever 236 is moved in unison therewith into latching engagement with the angular lever 235. Thus, the mirror mechanism is reset.

The front curtain release lever 240 is turned counter-clockwise by the resetting lever 240b in response to the operation of the film winding lever through a certain intermediary against the force of spring 240a, until it is latched by the lever 239.

The movement of lever 218 further causes clockwise movement of bellcrank 249 together with lever 246 against the force of spring 246a, thereby the armature 247 is moved toward the permanent magnet 245 while permitting the resilient member 218b to buffer the rapidly increasing magnetic force exerted between the armature 247 and the permanent magnet 245.

In order to make an exposure in the manual diaphragm control mode, the diaphragm preselecting ring 202 is turned to place the symbol "AE" out of registry with the index 201, thereby the cam lobe 200b is moved away from the pin 204 causing the opening of switch $S_4$ and also causing actuation of a not shown clamping member for the arresting device of the invention. Subsequent operation proceeds in a manner similar to that shown above.

It will be seen from the foregoing detailed description that the present invention provides an electromagnetically operated control device adapted for use in a photographic camera which device comprises an electromagnet with a yoke, movable means 229 carrying an armature, a first spring connected to the movable means to urge the armature for movement into the direction toward the yoke, and driving means 230 biased by a second spring and arranged to act on the movable means through a position-adjusting pin under the action of the second spring only when the camera is released and to be cut off from the driving engagement with the pin so long as the camera is maintained in the cocked position, thereby it being made possible to insure that the armature is retained in intimate contact with the yoke at an accurately controlled location under the action of the first spring each time the device is reset. With this arrangement, as there is no gap between the armature and the yoke, the period of actuation of the control device can be accurately controlled to improve the accuracy of exposure control of the camera and also can be minimize to prevent for the photographer to let a good shutter chance slip. Another advantage deriving from the provision of the transmitting pin as constructed in the form of an eccentric pin to serve as a position-adjusting means for eliminating the gap between the driving means and the transmitting pin due to the unavoidably imparted plays between the various moving parts of the device is that the movable means carrying the armature is acted on by the driving means under the action of the driving spring without the production of a shock which would be otherwise effected because of the impossibility of eliminating the above-identified gap, thus avoiding the occurrence of accidental operation of the movable means.

What is claimed is:

1. An electromagnetic control system comprising:
   (a) an electromagnet;
   (b) movable means arranged to be movable between a position where it is in contact with said electromagnet and a position where it is spaced apart from said electromagnet;
   (c) first resilient means connected to said movable means to urge said movable means for movement to said contacting position;
   (d) driving means for driving said movable means wherein said driving means is shifted between a first position at which said movable means remains at a contacting position and a second position at which said movable means is driven by said driving means to a spaced position;
   (e) second resilient means connected to said driving means to urge said driving means for movement to the second position;
   (f) resetting means for moving said driving means to the first position against the force of said second resilient means;

(g) latching means for latching said driving means in the first position;

(h) release means for releasing said latching means from its latching position; and (i) transmitting means arranged between said movable means and said driving means, wherein said transmitting means releases the associated state between the driving means and the movable means as the driving means is shifted from the second position to the first and retains said associated state as the driving means is shifted from the first position to the second position, said transmitting means being provided with position-adjusting means arranged to adjust the spacing relation between said driving means latched in the first position and said movable means;

whereby when said driving means is moved to the first position, said movable means is caused to move to the contacting position by said first resilient means, while when said driving means is moved to the second position, said movable means is caused to move to the spaced apart position under the action of said second resilient means which overcomes said first resilient means.

2. An electromagnetic control system according to claim 1, wherein said first and said second resilient means are springs, and said second resilient means has a larger springing force than said first resilient means.

3. An electromagnetic control system according to claim 1, wherein said movable means has an armature arranged to cooperate with said electromagnet and has an output member carrying said armature and arranged to be acted on by said driving means through said transmitting means.

4. An electromagnetic control system for a camera, said system comprising:

(a) an electromagnet;

(b) electric current flow control means for controlling the period of energization of said electromagnet, said control means being actuable in response to the release of said camera;

(c) a diaphragm means;

(d) an adjusting means to set an aperture of said diaphragm means, wherein said adjusting means is activated in association with a release of the camera;

(e) arresting means arranged to be movable between a position where it is in contact with said electromagnet and a position where it is spaced apart from said electromagnet to arrest said scanning means;

(f) first resilient means connected to said arresting means to urge said arresting means for movement toward the contacting position;

(g) driving means to drive said movable means, wherein said driving means is shifted between a first position at which said arresting means remains at a contacting position and a second position at which said movable means is driven by said driving means to a spaced apart position;

(h) second resilient means connected to said driving means to urge said driving means for movement to the second position;

(i) latching means for latching said driving means in the first position;

(j) release means for releasing said latching means from its latching position in response to the release of said camera;

(k) resetting means for moving said driving means to the first position against the force of said second resilient means when said camera is reset; and (l) a transmitting means provided between the movable means and the driving means, wherein said transmitting means is provided with position-adjusting means arranged to adjust the spacing relation between said driving means latched in the first position and said arresting means and wherein said transmitting means releases an associated state between the driving means and the movable means as the driving means is shifted from the second position to the first position and retains said associated state as the driving means is shifted from the first position to the second positon.

5. An electromagnetic control system according to claim 4, wherein said first and said second resilient means are springs, and said second resilient means has a larger spring force than said first resilient means.

6. An electromagnetic control system according to claim 4, wherein said arresting means has an armature arranged to cooperate with said electromagnet and an output member carrying said armature and arranged to be acted on by said driving means through said transmitting means.

* * * * *